United States Patent
Stoschek et al.

(10) Patent No.: US 7,432,459 B2
(45) Date of Patent: Oct. 7, 2008

(54) SEAT CONTROL UNIT FOR ADJUSTING A VEHICLE SEAT AND VEHICLE SEAT CONFIGURATION

(75) Inventors: Arne Stoschek, Palo Alto, CA (US); Brian Ng, Los Altos, CA (US); Michael Derse, Menlo Park, CA (US); Philippe Alessandrini, Palo Alto, CA (US); Steffen Ross, Wettstetten (DE); Sven Strohband, Mountain View, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 70 days.

(21) Appl. No.: 11/394,623

(22) Filed: Mar. 31, 2006

(65) Prior Publication Data

US 2007/0235297 A1    Oct. 11, 2007

(51) Int. Cl.
*H01H 9/00* (2006.01)
(52) U.S. Cl. .................................. 200/5 R; 200/512
(58) Field of Classification Search ............. 200/5 R, 200/511, 512; 174/117 M; 318/282, 286, 318/101
See application file for complete search history.

(56) References Cited

U.S. PATENT DOCUMENTS

| | | | |
|---|---|---|---|
| 4,689,537 A | | 8/1987 | Mizuta et al. |
| 4,695,682 A | * | 9/1987 | Winogrocki ................. 200/5 R |
| 5,668,357 A | | 9/1997 | Takiguchi et al. |
| 5,952,630 A | * | 9/1999 | Filion et al. ................. 200/5 R |
| 6,483,048 B1 | * | 11/2002 | Bontrager et al. ............ 200/5 R |
| 6,501,465 B2 | * | 12/2002 | Sandbach .................... 345/173 |
| 6,585,162 B2 | * | 7/2003 | Sandbach et al. ......... 235/462.44 |
| 6,657,140 B2 | * | 12/2003 | Rantet ........................ 200/5 R |
| 6,765,158 B1 | * | 7/2004 | Morrison et al. ............ 200/5 R |
| 7,002,089 B2 | * | 2/2006 | Stevenson ................... 200/512 |
| 7,084,360 B2 | * | 8/2006 | Schmidt et al. .............. 200/5 R |
| 7,161,084 B2 | * | 1/2007 | Sandbach .............. 174/117 M |

FOREIGN PATENT DOCUMENTS

| | | |
|---|---|---|
| DE | 198 34 163 A1 | 2/2000 |
| DE | 199 55 326 A1 | 5/2001 |
| EP | 1 059 191 B1 | 8/2004 |
| EP | 1 031 457 B1 | 4/2005 |

OTHER PUBLICATIONS

E. Rehmi Post, Maggie Orth, Smart Fabric, or Washable Computing, http://web.media.mit.edu/~rehmi/fabric/, last accessed Dec. 22, 2005.

* cited by examiner

*Primary Examiner*—Michael A Friedhofer
(74) *Attorney, Agent, or Firm*—Manfred Beck, P.A.

(57) ABSTRACT

A seat control unit for adjusting a vehicle seat includes a touch sensor having a touch-sensitive fabric. The touch-sensitive fabric is disposed on a support layer which may be formed by a vehicle interior component such as the vehicle seat, an interior door panel or an armrest. The touch sensor generates signals in response to a force exerted on the touch-sensitive fabric. A control circuit is connected the touch sensor and receives the signals generated by the touch sensor. The control circuit determines a position of the force exerted on the touch-sensitive fabric and generates control signals for controlling the vehicle seat in dependence on the position of the force exerted on the touch-sensitive fabric.

13 Claims, 7 Drawing Sheets

SEAT CONTROL UNIT FOR ADJUSTING A VEHICLE SEAT AND VEHICLE SEAT CONFIGURATION

BACKGROUND OF THE INVENTION

Field of the Invention

The invention relates to a seat control unit for adjusting a vehicle seat and to a vehicle seat configuration.

Vehicle seats are generally adjustable seats that can be moved forward and backward along a longitudinal direction in accordance with the preference of the vehicle occupant. Also, the incline of the backrest of the vehicle seat is generally adjustable. Increasingly vehicle seats are power-operated and the vehicle occupant adjusts the vehicle seat via a seat control unit. For example, the vehicle occupant presses a button in order to move the vehicle seat forward and then presses another button in order to change the incline of the backrest.

Motor vehicles are often equipped with power-operated seats that have a large number of adjustment possibilities. For example, such vehicle seats can not only be moved forwards and backwards but can also be moved up and down. Further functions for increasing comfort may include an adjustable lumbar support, a massage function, and a heating or cooling function. Adding all these functions to a vehicle seat requires an increased number of buttons or switches for controlling the vehicle seat. The seat control unit for such a vehicle seat may therefore become rather large and as a result requires an increased amount of installation space.

U.S. Pat. No. 5,668,357 discloses a conventional seat control unit that has a plate-like switch unit with a board having a plurality of contacts. A sheet-like rubber contact member is placed on the board. The sheet-like rubber contact member has convex switch portions for opening and closing the contacts. A cover plate is placed over the switch unit which is fixedly mounted on a side surface of a seat portion. The cover plate has windows formed therein and the switch portions are exposed through these windows. A disadvantage of this seat control unit is that it is rather large and therefore requires a correspondingly large amount of installation space.

Further seat control units are disclosed in U.S. Pat. No. 4,689,537, European Patent Document Nos. EP 1 059 191 B1, EP 1 031 457 B1, and German Patent Application Nos. DE 198 34 163 A1 and DE 199 55 326 A1.

Conventional seat control units of the type described above, have a housing for electronic components. The space requirements for such a housing make a conventional seat control unit bulky. Installation of the seat control unit is therefore limited to places that meet the installation space requirements of the seat control unit. The space requirements for the electronic parts of conventional seat control units also prevent the seat controls from being placed close together and from being placed in unique geometries. In addition, conventional seat control units require mounting brackets or other mounting facilities that allow mechanically holding housing components in place. In other words, the installation space for a conventional seat control unit must provide a certain mechanical stability and therefore the installation is limited to places that provide mechanically stable mounting points.

A further aspect of conventional seat control units is that seat control units differ in different vehicle platforms and even in different models of the same vehicle platform. As a result, a car company must design, test and fabricate different seat control units with the associated input electronics for the different models. Also, a seat control unit for a car with a specific function, such as a lumbar support, is different from a seat control unit for a car without the function because the number of buttons and the arrangement of the buttons are different.

Another disadvantage of conventional seat control units is that they have binary buttons which allow only a simple on-off function for a seat adjustment function. Such a seat control does not allow a varying degree of input from a user. As a result, a user cannot select the speed with which the user would like to adjust the vehicle seat. This may make it difficult to perform a fine adjustment of the vehicle seat.

A further disadvantage of conventional seat control units is that they require a button for each adjustment direction. For example, if a vehicle seat can be moved forwards, backwards, upwards and downwards, then four buttons are provided for adjusting the position of the vehicle seat. Further buttons are provided for adjusting the incline angle of the backrest and possibly even more buttons if more adjustment functions are provided. A disadvantage of such a seat control unit is that the large number of buttons may result in a complicated operation. Also manufacturing costs and installation space requirements may increase with an increasing number of buttons.

Due to the above-mentioned disadvantages of conventional seat control units resulting from their installation space requirements and their switch configuration, conventional seat control units are mounted in installation spaces that can accept large and bulky components. Conventional seat controls are therefore generally mounted in a seat bottom or in a vehicle door.

SUMMARY OF THE INVENTION

It is accordingly an object of the invention to provide a seat control unit which overcomes the above-mentioned disadvantages of the heretofore-known seat control units of this general type. It is in particular an object of the invention to provide a seat control unit which can be installed on most surfaces of a vehicle interior, which can be used for different vehicle seats and different vehicle models, which allows an improved seat adjustment procedure, which reduces the number of required buttons and which can be integrated into the vehicle interior in an aesthetically pleasing manner.

With the foregoing and other objects in view there is provided, in accordance with the invention, in combination with a vehicle seat, a seat control unit including:

a touch sensor including a touch-sensitive fabric;

a support layer for the touch-sensitive fabric, the touch-sensitive fabric being disposed on the support layer;

the touch sensor generating signals in response to a force exerted on the touch-sensitive fabric;

a control circuit connected the touch sensor;

the control circuit receiving the signals generated by the touch sensor and determining a position of the force exerted on the touch-sensitive fabric; and the control circuit generating control signals for controlling the vehicle seat in dependence on the position of the force exerted on the touch-sensitive fabric.

By using a touch sensor in accordance with the invention, it is possible to dispense with conventional switches and buttons which require more installation space than a touch sensor according to the invention which is a substantially flat sensor that is simply placed on a support layer. The touch sensor according to the invention does not require mounting brackets, mounting holes or other mechanical mounting devices as is the case with conventional seat adjustment switches.

The seat control unit according to the invention has an input touchpad which is based on an electrically conductive fabric or so-called electronic fabric. Using the touch-sensitive electronic fabric allows configuring the seat control unit as a thin, flexible and programmable input device. The touch-sensitive electronic fabric is for example only a few millimeters thick, allowing for very thin buttons to be made. Since these buttons are thin and flexible, they can be placed almost anywhere in a car, including in places where installation space is limited. Also, they can be put in places where it would be a safety hazard to have hard buttons, such as areas over a dashboard airbag or a steering wheel airbag.

In accordance with another feature of the invention, the touch sensor includes a cover layer; and the touch-sensitive fabric is disposed between the support layer and the cover layer.

In accordance with another feature of the invention, the support layer is a vehicle interior component such as a vehicle seat bottom, a center armrest, a door armrest, an interior door panel, a steering wheel, a dashboard, a center console or a remote control unit.

In accordance with yet another feature of the invention, the control circuit is a programmable control circuit such that the control circuit and the touch sensor are usable for different vehicle seats having different adjustment functions. An advantage of a programmable control circuit is that the same seat control hardware can be used for a variety of seats of different car models having different seat adjustment functions. Also, the seat functionality can be updated from year to year without requiring new seat control hardware.

This allows vehicle manufacturers to save money by simply reusing old seat control devices for new models. Another advantage is the reduction in the number of parts in the inventory of the vehicle manufacturer because the same touch-sensitive fabric and the same programmable control circuit can be used in different vehicle models.

Further, the touch-sensitive fabric allows the touch sensor to be configured in different ways through programming. Since the hardware itself, namely the touch-sensitive fabric does not change, the same piece of touch-sensitive fabric can be used in any vehicle model from year to year. By reprogramming the seat control unit, the user interface can be changed depending on the needs of the seat designer. For example, if a massage function is to be added in a conventional seat control unit, then an entirely new seat control unit has to be developed to allow for this additional functionality. In contrast, when using the touch sensor according to the invention, the same hardware, namely the touch-sensitive fabric, could be used with a different program that adds a spot on the touch-sensitive fabric for a massage function.

In accordance with a further feature of the invention, the touch sensor has embossed graphic symbols indicating seat adjustment functions. An advantage of embossed graphic symbols is that a user can adjust the seat without having to look at the touch sensor, simply by feeling the embossed graphic symbols. This is advantageous if the user wants to adjust the seat while driving.

In accordance with yet a further feature of the invention, the touch sensor has embossed arrows indicating respective adjustment directions. Using arrows on the touch sensor makes the operation of the seat adjustment unit intuitive because arrows are easily understood as the direction along which the vehicle seat is to be adjusted.

In accordance with another feature of the invention, the touch sensor has an embossed diagrammatic representation of the vehicle seat in order to make the operation of the seat adjustment unit more intuitive.

In accordance with yet another feature of the invention, the control circuit determines an amount of the force or pressure exerted on the touch-sensitive fabric; and the control circuit generates control signals for controlling the vehicle seat in dependence on the position and the amount of the force exerted on the touch-sensitive fabric. An advantage of a seat control in dependence of the position of the force impact, which may be expressed in terms of x-coordinates and y-coordinates, and additionally in dependence on the amount of force or pressure in a direction of a z-coordinate allows for an intuitive way to control a seat adjustment speed, for example, the harder the user presses, the faster the seat moves.

In accordance with a further feature of the invention, the control circuit is programmed such that the vehicle seat is adjusted with an increased speed if the amount of the force exerted on the touch-sensitive fabric is increased. This feature allows a user to choose the adjustment speed which makes it easier to quickly and, at the same time, accurately adjust the vehicle seat.

In accordance with another feature of the invention, the vehicle seat has a seat bottom, a backrest and a headrest; the touch sensor has a subregion assigned for adjusting a seat component selected from the group including the seat bottom, the backrest and the headrest; and the control circuit and the touch sensor are configured such that the seat component is adjusted by exerting a force in a sliding motion on the subregion of the touch sensor. An advantage of a configuration using such a vector input that allows adjusting the vehicle seat by a sliding or swiping motion is that no individual buttons or regions are necessary for each direction. In other words, a single subregion of the touch sensor can be used for more than one seat adjustment function. For example, one subregion of the touch sensor can be used for adjusting the vehicle seat forwards, backwards, upwards and downwards by sliding a finger across the touch sensor in a corresponding direction.

In accordance with yet another feature of the invention, the control circuit determines a direction of the sliding motion across the subregion of the touch sensor; and the control circuit generates control signals for controlling the seat component in dependence on the direction of the sliding motion across the subregion of the touch sensor.

In accordance with another feature of the invention, the control circuit determines a speed of the sliding motion across the subregion of the touch sensor; and the control circuit generates control signals for controlling the seat component in dependence on the speed of the sliding motion across the subregion of the touch sensor. In this case, a user can for example vary the adjustment speed by varying the speed with which the user slides his or her finger across the subregion.

In accordance with a further feature of the invention, the control circuit and the touch sensor are configured such that the control circuit distinguishes between a force exerted by a sliding motion on the subregion of the touch sensor and a force exerted only in a given position of the subregion of the touch sensor. In this case, the touch sensor allows a directional input by sliding a finger across the subregion and also allows a function equivalent to pressing a button by the same input device. For example, the touch sensor could be configured such that if a user wanted to adjust a seat in a given direction, then the user would slide his or her finger on the touch sensor in the given direction in order to adjust the seat. The same region of the touch sensor could be used for the function of pressing a button because the control circuit can be programmed to detect a force generated by tapping on the touch sensor.

With the objects of the invention in view there is also provided, a vehicle seat configuration including:

a vehicle seat having a seat bottom and a backrest;

a seat control unit operatively connected to the vehicle seat, the seat control unit including a touch sensor, a support layer and a control circuit;

the touch sensor including a touch-sensitive fabric;

the touch-sensitive fabric being disposed on the support layer; the touch sensor generating signals in response to a force exerted on the touch-sensitive fabric;

the control circuit being connected to the touch sensor and receiving the signals generated by the touch sensor, the control circuit determining a position of the force exerted on the touch-sensitive fabric; and the control circuit generating control signals for controlling the seat bottom and/or the backrest in dependence on the position of the force exerted on the touch-sensitive fabric.

Other features which are considered as characteristic for the invention are set forth in the appended claims.

Although the invention is illustrated and described herein as embodied in a seat control unit for adjusting a vehicle seat and a vehicle seat configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
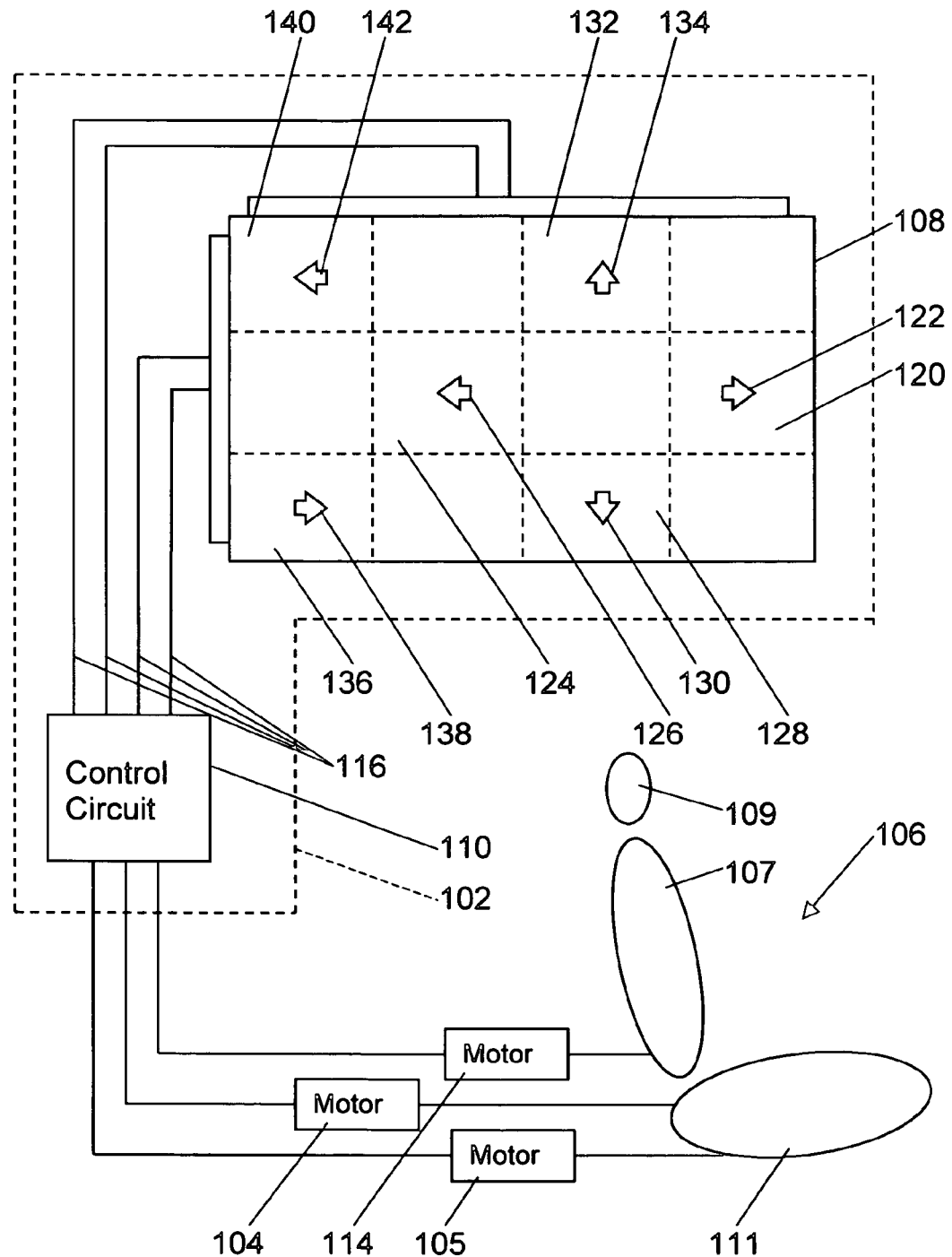
FIG. 1 is a schematic overview of a vehicle seat configuration having a seat control unit according the invention.

Referring now to the figures of the drawings in detail and first, particularly, to FIG. 1 thereof, there is shown a schematic overview of a seat control unit 102 connected to a plurality of electric motors 104, 105, 114 for adjusting a vehicle seat 106. The seat control unit 102 includes a touch sensor 108 and a control circuit 110.

The touch sensor 108 is embodied as a so-called electronic fabric. Such a touch-sensitive electronic fabric may for example include two electrically conducting fabric planes which are separated from one another by an electrically insulating fabric placed between the two electrically conducting fabric planes. The two electrically conducting fabric planes and the electrically insulating fabric plane placed between the two electrically conducting fabric planes are for example configured such that when a force is applied to the touch-sensitive electronic fabric, the two electrically conducting planes are brought closer to another and an electric current may flow between the two electrically conducting planes at the position where the force is applied. Specific embodiments of electronic fabrics are for example described in detail in U.S. Pat. No. 6,492,980 B2. In accordance with an alternative embodiment of the invention, the electronic fabric may be a capacitive sensor that detects a contact with human skin due to a reduction of the sensor's capacitance when being touched.

The touch-sensitive electronic fabric of the touch sensor 108 is connected to the control circuit 110 via connecting lines 116. The connecting lines 116 are used to provide a supply voltage to the touch sensor 108 and to provide signals to the control circuit 110 in response to a force being exerted on the touch sensor 108.

The touch sensor can be conceptually divided into subregions which are indicated by dashed lines in FIG. 1. When a force is exerted on one of the subregions, then the touch sensor 108 provides a signal to the control circuit 110 which allows the control circuit 110 to determine which of the subregions has been touched. The control circuit 110 preferably not only determines the subregion or position on the touch sensor 108 where the force or pressure has been applied but also determines the amount of force or pressure that has been applied.

The subregions of the touch sensor 108 are assigned to different control functions necessary to adjust the vehicle seat 106. In the embodiment shown in FIG. 1, a subregion 120 is for example assigned for the function of moving the vehicle seat 106 forward. An arrow 122 is provided in the subregion 120 in order to indicate its control function. If a force is exerted by pressing subregion 120, a signal is generated in response to this force. The control circuit 110 determines that a force is applied to subregion 120 and the control circuit 110 controls a corresponding motor 104 such that the motor 104 moves the vehicle seat 106 forward.

Correspondingly, a subregion 124 is assigned for the function of moving the vehicle seat 106 backwards. An arrow 126 is provided in the subregion 124 in order to indicate the direction in which the seat 106 will be moved if pressure is exerted on the subregion 124. If a force is exerted by pressing subregion 124, the touch sensor 108 generates a signal in response to the force. The control circuit 110 determines that a force is applied to subregion 124 and the control circuit 110 controls the corresponding motor 104 such that the motor 104 moves the vehicle seat 106 backwards.

A further subregion 128 is assigned for moving vehicle seat 106 down. An arrow 130 in the subregion 128 indicates the downward direction. If a force is exerted by pressing subregion 128, a response signal is generated by the touch sensor 108 and the control circuit 110 evaluates the response signal. The control circuit 110 controls a corresponding motor 105 such that the motor 105 moves the vehicle seat 106 downwards.

A subregion 132 is provided for adjusting the seat in an upward direction. An arrow 134 indicates the direction in which the seat will be moved if pressure is exerted on the subregion 132. The touch sensor 108 generates a signal indicating that a force is exerted on the subregion 132. The control circuit 110 in response controls the motor 105 so that a height adjustment is performed by moving the vehicle seat 106 up.

The touch sensor 108 further has subregions 136 and 140 for adjusting the backrest 107 of the vehicle seat 106. Subregion 136 is used for moving the backrest 107 forward into an upright position. An arrow 138 in the subregion 136 indicates the movement direction of the backrest 107. If a force is exerted by pressing subregion 136, a response signal is generated by the touch sensor 108. The control circuit 110 receives and evaluates the response signal and causes the motor 114 to move the backrest forward into an upright position.

Correspondingly, the subregion 140 is provided for moving the backrest 107 of the vehicle seat 106 backwards into a reclined position which is indicated by an arrow 142. A signal indicating that a force is exerted on the subregion 140 is generated when pressure is exerted in on subregion 140. The motor 114 then moves the backrest 107 of the vehicle seat 106 backwards into a reclined position.

The touch sensor 108 can preferably not only detect which subregion is subjected to pressure but can also detect the amount of pressure or force. In accordance with such an embodiment of the touch sensor 108, the control circuit 110 would be configured to control the speed of the motors 104, 105, 114 in accordance with the amount of pressure exerted on the touch sensor 108. For example, if a small force is exerted on the subregion 120, then the control circuit 110 would control the motor 104 such that the vehicle seat 106 is moved forward slowly. If on the other hand a large force is exerted on subregion 120, then the control circuit 110 would control the motor 104 such that the vehicle seat 106 is moved forward quickly. A user could thus increase or decrease the speed at which the vehicle seat 106 moves by increasing or decreasing the pressure on the subregion 120. The control circuit 110 can be configured to control the functions of all subregions 120, 124, 128 132, 136, 140 such that the adjustment speed changes corresponding to the pressure exerted on the respective subregion.

The touch sensor 108 of FIG. 1 is conceptually divided into twelve subregions as indicated by the dashed lines. Only the seat adjustment functions for six of the subregions have been described in order to explain the concept of the seat control unit according to the invention. Further seat adjustment functions may be added to the touch sensor 108. For example, the headrest 109 of the vehicle seat 106 could be adjusted via the touch sensor 108. An adjustable lumbar support could be added to the vehicle seat 106 and adjusted via the touch sensor 108. Further functions such as a seat heating or cooling function could also be controlled via the touch sensor 108. The touch sensor 108 is illustrated as being conceptually divided into rectangular subregions, however it is noted that the subregions can be arbitrary regions that are established in dependence on how the control circuit 110 is programmed.

Figure 2:
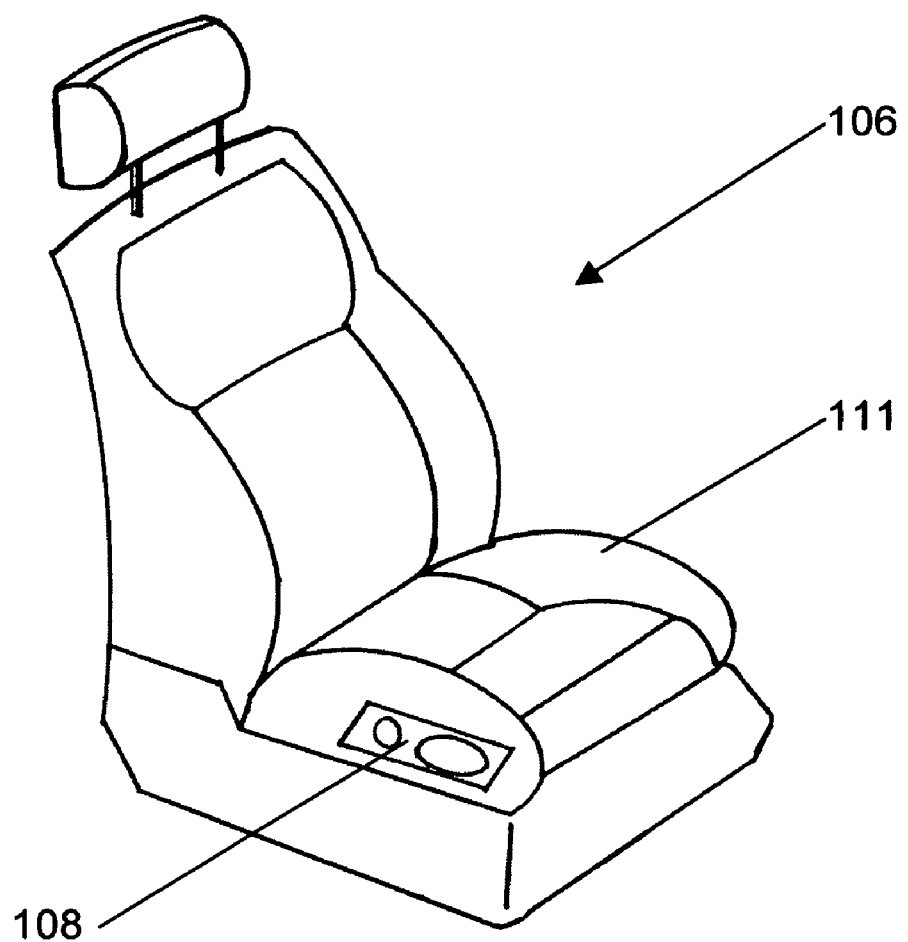
FIG. 2 is a diagrammatic perspective view of a vehicle seat with a touch sensor integrated into the seat bottom in accordance with the invention.

FIG. 2 is a diagrammatic perspective view of a vehicle seat 106 with a touch sensor 108 integrated into the seat bottom 111 in accordance with the invention. The touch sensor 108 is integrated into a side of the seat bottom 111. The touch sensor 108 which is formed of a touch-sensitive electronic fabric is only a few millimeter thick and therefore can be easily integrated on the side of the seat bottom 111. Since the touch-sensitive fabric which forms the touch sensor 108 is flat and flexible, it can simply be attached to a support layer or base layer 404 such as a vehicle interior component without requiring any mounting brackets or similar installation hardware that is required for holding conventional seat control units in place.

Figure 3:
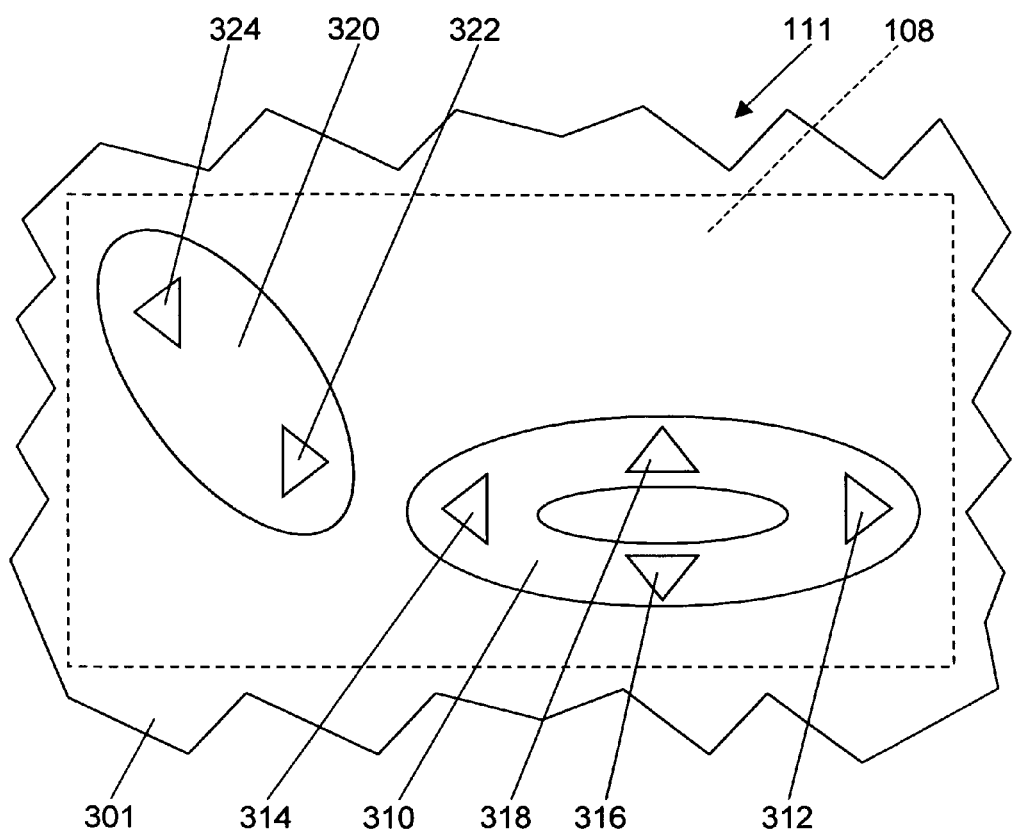
FIG. 3 is a diagrammatic view of a detail of the seat bottom shown in FIG. 2 with the integrated touch sensor according to the invention.

FIG. 3 is a diagrammatic view of a detail of the seat bottom 111 with the integrated touch sensor 108 according to the invention. Specifically, FIG. 3 shows a portion of the side surface of the seat bottom 111 of the vehicle seat 106 shown in FIG. 2. The portion of the side surface of the seat bottom 111 is in the exemplary embodiment a leather surface 301 with an arrow graphics embossed in the leather. The leather surface 301 forms the surface of the vehicle seat and thus the seat control is integrated into the vehicle seat in an aesthetically pleasing manner. The touch-sensitive fabric 402 that forms the touch sensor 108 is placed underneath the leather surface 301.

The arrow graphics shown in FIG. 3 can be configured in the same manner as the arrows shown in FIG. 1. Respective subregions of the touch sensor 108 would be placed such that they are positioned underneath a corresponding arrow embossed in the leather surface.

In this case, the oval 310, which encircles four arrows 312, 314, 316, 318, would represent the seat bottom 111 and the four arrows 312, 314, 316, 318 represent the four directions for adjusting the vehicle seat bottom 111. Exerting pressure on the arrow 312 pointing in a forward direction would move the vehicle seat 106 forward. Pressure on the arrow 314 pointing in the opposite direction would move the vehicle seat 106 backwards. Pressing the arrow 316 that points downward would move the vehicle seat 106 downward and pressing the arrow 318 pointing upwards would move the vehicle seat 106 upwards. The arrows 312, 314, 316, 318 in the oval 310 therefore allow adjusting the vehicle seat along a longitudinal axis of the vehicle and also allow adjusting the seating height.

The oval 320 would represent the backrest 107 of the vehicle seat 106. The arrows 322, 324 which are encircled by the oval 320 indicate the directions of adjustment. Specifically, the backrest 107 could be moved forward into an upright position by pressing arrow 322. Pressing the arrow 324 would move the backrest 107 backwards into a reclined position.

Figure 4:
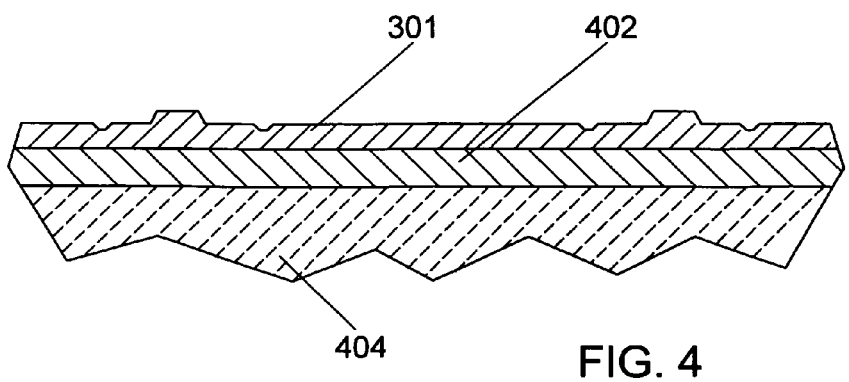
FIG. 4 is a partial diagrammatic sectional view of the touch sensor of FIG. 3 in accordance with the invention.

FIG. 4 is a diagrammatic sectional view of the touch sensor of FIG. 3 in accordance with the invention. The embodiment shown in FIG. 4 has a touch-sensitive fabric 402 which is covered by a cover layer 301 which is formed in this case by a layer of embossed leather. The cover layer 301 allows an aesthetically pleasing integration of the touch sensor 108 into vehicle interior components such as armrests, vehicle interior panels, seat surfaces, dashboards or steering wheels. In this case, the touch sensor 108 is integrated into the seat bottom 111 of the vehicle seat 106. The touch-sensitive fabric 402 is disposed on a support layer 404. No mounting hardware, such as mounting brackets, screws or the like, is needed. As can be seen from FIG. 4, the touch sensor 108 is a substantially flat sensor that is only a few millimeters thick. Because no mounting hardware is necessary and because the touch-sensitive fabric 402 is flexible, it is possible to install the touch sensor 108 on substantially any surface of the vehicle interior even if that surface is curved. The touch sensor 108 may even be mounted on a part of a steering wheel or dashboard that serves as an airbag cover.

Figure 5:
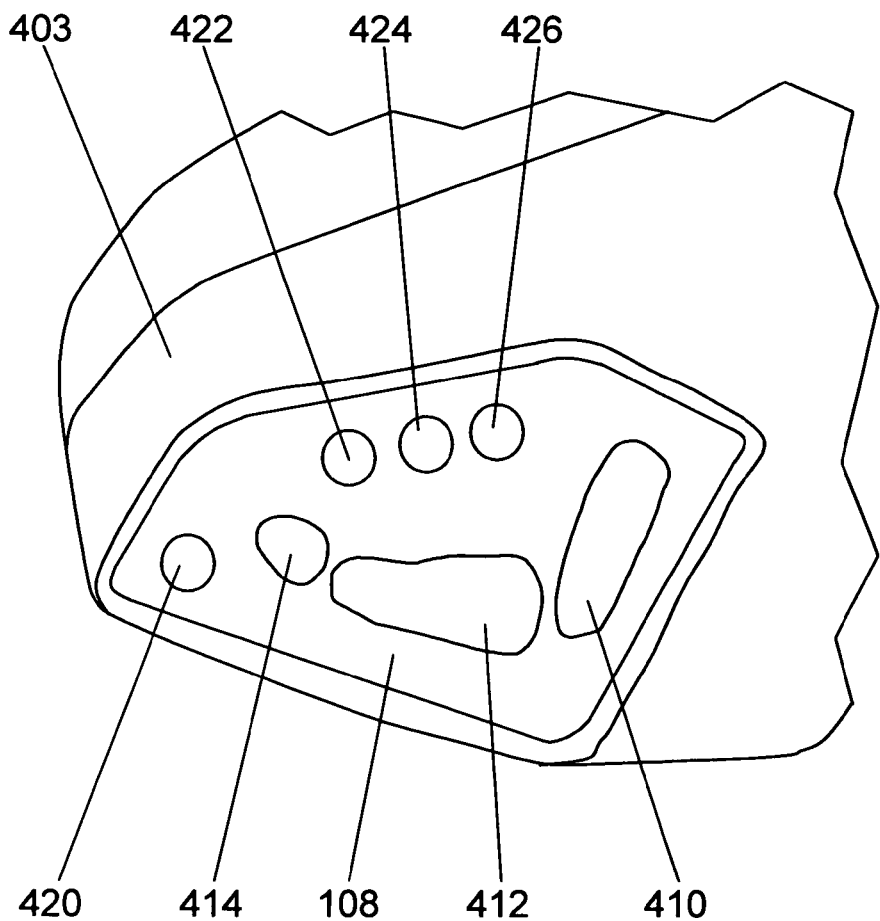
FIG. 5 is a partial diagrammatic perspective view of an armrest of a vehicle with a seat control integrated into the armrest in accordance with the invention.

FIG. 5 is a diagrammatic perspective view of an armrest of a vehicle with a seat control integrated into the armrest in accordance with the invention. An armrest 403, which is positioned next to a vehicle seat 106, includes a touch sensor 108. The touch sensor 108 includes a touch-sensitive fabric 402 as described above wherein the touch-sensitive fabric 402 may be placed underneath a cover layer 301 such as a leather surface, a plastic surface or another fabric surface. Placing the touch-sensitive fabric 402 underneath a cover layer 301 provides a homogeneous surface structure for the armrest 403. The touch sensor 108 has a graphic symbol of a vehicle seat. The graphic symbol is preferably configured such that it can be recognized by touch. The graphic symbol may for example be an embossed structure or may have a surface structure that is different from the surface structure of the surrounding material.

In the exemplary embodiment, the graphic symbol depicts a seat bottom 410, a backrest 412, and a headrest 414. The touch sensor 108 and the control circuit 110 can be configured such that the seat adjustment can be performed in an intuitive manner. For example, the touch sensor 108 and the control circuit 110 can be configured such that a user can move the vehicle seat 106 forward by pressing on front portion of the depiction of the seat bottom 410. Conversely, a user could move the vehicle seat 106 backwards by pressing on a rear portion of the depiction of the seat bottom 410.

In a similar manner, the touch sensor 108 and the control circuit 110 could be configured such that the backrest 107 of the vehicle seat 106 is moved forward into an upright position by pressing on a front portion of the depiction 412 of the backrest on the touch sensor 108. Accordingly, the backrest 107 of the vehicle seat could be moved backwards into a reclined position by pressing on a rear portion of the depiction 412 of the backrest on the touch sensor 108. The headrest 109 could be adjusted in the same manner as the seat bottom 111 and the backrest 107.

In accordance with an additional feature of the touch sensor 108, the adjustment speed is dependent on the amount of pressure exerted on the touch sensor 108. Increasing the pressure on the touch sensor 108 would increase the speed with which the vehicle seat 106 is adjusted.

In accordance with an alternative embodiment, the touch sensor 108 and the control circuit 110 could be configured such that the vehicle seat 106 is adjusted in accordance with pressure exerted on the touch sensor 108 by sliding a finger across the touch sensor. In this case, the touch sensor 108 would operate similar to a touch pad of a computer. In particular, sliding a finger across the depiction of the seat bottom 410 in a direction from back to front would move the vehicle seat 106 forward. Sliding a finger across the depiction of the seat bottom 410 in a direction from front to back would move the vehicle seat 106 backwards.

Accordingly, the backrest 107 of the vehicle seat 106 would move forward into an upright position by sliding a finger in a forward motion across the depiction 412 of the backrest on the touch sensor 108. The backrest 107 would moved backwards into a reclined position by sliding a finger in a backward motion across the depiction 412 of the backrest on the touch sensor 108. The headrest 109 would be adjusted by sliding a finger across the depiction 414 of the headrest in the intended adjustment direction.

Further seat adjustment functions are performed via further seat control regions 420, 422, 424, 426 on the touch sensor 108. At least some of the seat control regions 420, 422, 424, 426 are used as memory buttons which adjust the vehicle seat 106 in accordance with a preference of a specific user.

Figure 6:
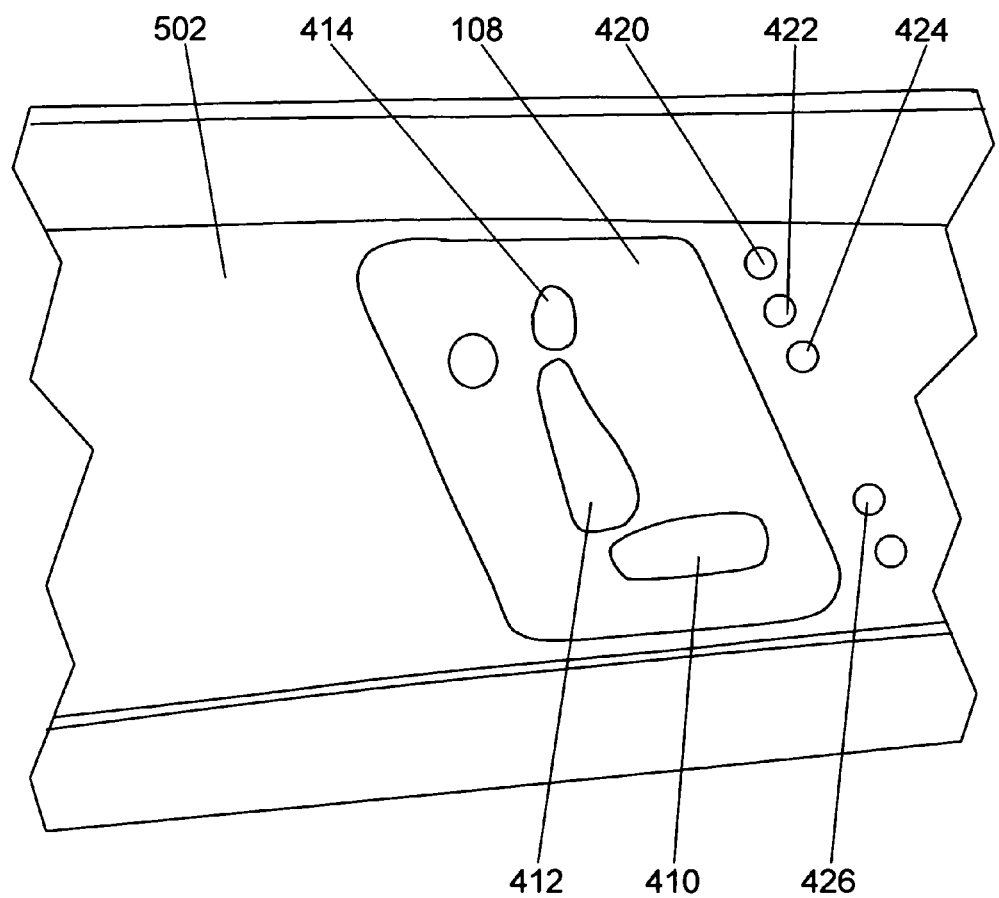
FIG. 6 is a partial diagrammatic perspective view of an interior door panel of a vehicle with a seat control integrated into the interior door panel in accordance with the invention.

FIG. 6 is a diagrammatic perspective view of an interior door panel 502 of a vehicle with a seat control integrated into the interior door panel 502 in accordance with the invention. The interior door panel 502 includes a touch sensor 108 with a touch-sensitive fabric that is configured as described above. The touch-sensitive fabric may be placed underneath a cover layer such as a leather surface, a plastic surface or another fabric surface in order to provide a homogeneous surface structure across the interior door panel 502. The touch sensor 108 has a graphic symbol of a vehicle seat which includes a seat bottom 410, a backrest 412, and a headrest 414. The touch sensor 108 and the control circuit 110 can be configured in the same manner as described above for the touch sensor 108 integrated into the armrest 403. As explained above, the touch sensor 108 could be configured such that the vehicle seat is moved forward by pressing on the front portion of the depiction of the seat bottom 410 or by sliding a finger across the depiction of the seat bottom 410 in the intended movement direction, i.e. from back to front. The vehicle seat 106 could accordingly be moved back by pressing on a rear portion of the depiction of the seat bottom 410 or by sliding a finger across the depiction of the seat bottom 412 in the intended movement direction.

The backrest 107 of the vehicle seat 106 can be adjusted in accordance with the same principle which means that it can be moved forward into an upright position by pressing on a front portion of the depiction 412 of the backrest on the touch sensor 108 or by sliding a finger across the depiction 412 of the backrest in the intended movement direction. The headrest of the vehicle seat is adjustable in the same manner. In accordance with an additional feature of the touch sensor 108, the adjustment speed is dependent on the amount of pressure exerted on the touch sensor. Further seat control functions, such as a seat memory function or a seat heating function, are performed via further seat control regions 420, 422, 424, 426 on the touch sensor 108.

In accordance with an alternative embodiment, the vehicle seat 106 could be controlled by first selecting a seat component to be adjusted and then moving the seat component in a desired direction by sliding a finger across a subregion in the desired direction. For example, if a user wanted to move the backrest forward into an upright position, the user could select the backrest by pressing on the depiction 412 of the backrest. After selecting the backrest in this manner, the user could slide his or her finger in a forward motion across a subregion of the touch sensor. The backrest would then be adjusted in the desired direction.

Figure 7:
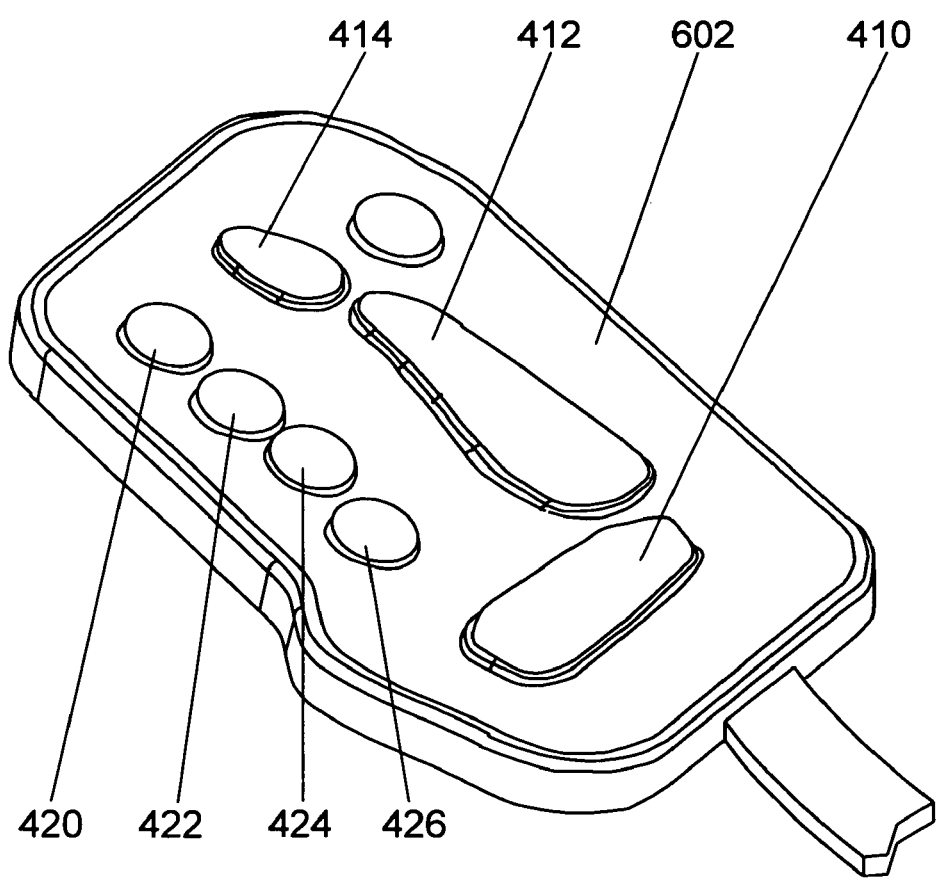
FIG. 7 is a diagrammatic perspective view of a remote control unit for controlling a vehicle seat in accordance with the invention.

FIG. 7 is a diagrammatic perspective view of a remote control unit 602 for controlling a vehicle seat in accordance with the invention. The remote control unit 602 has a touch sensor 108 with a graphic symbol of a vehicle seat which allows a user to adjust the vehicle seat 106 in the same manner as described for the embodiments shown in FIG. 1 to 6.

Figure 8:
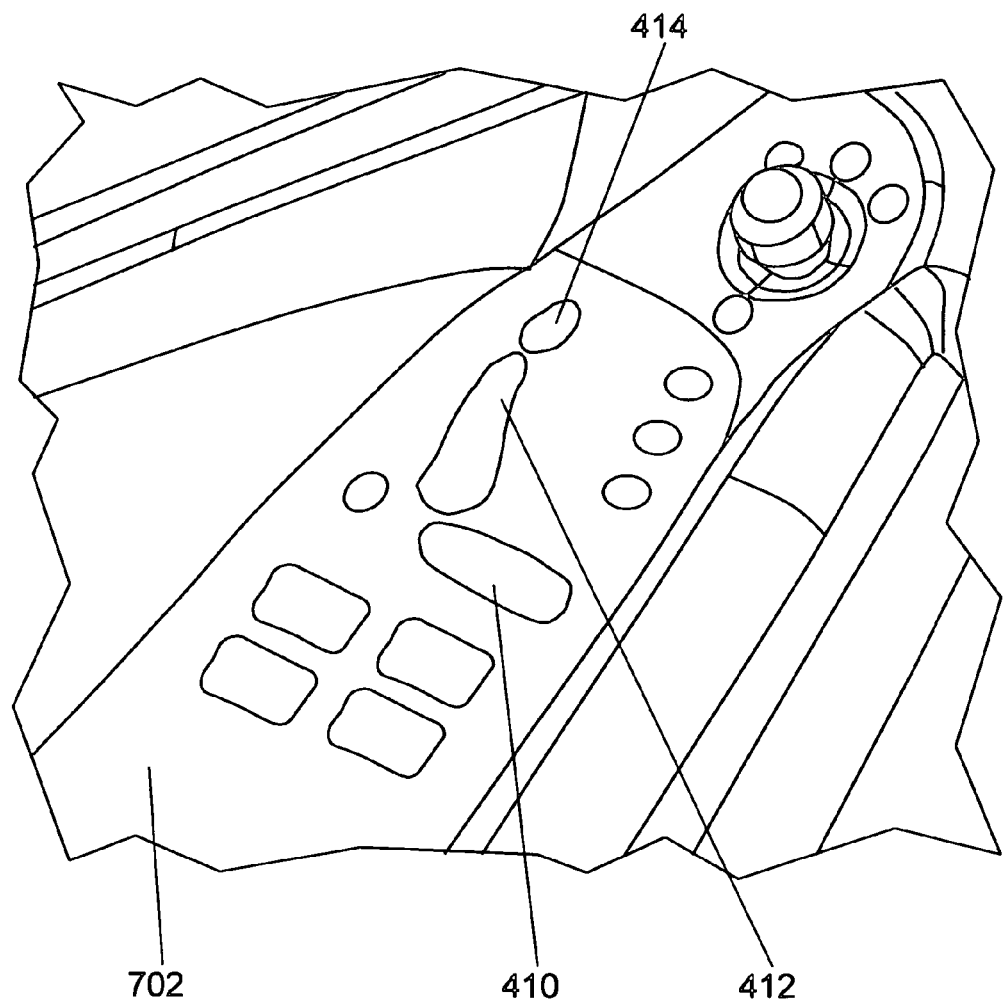
FIG. 8 is a partial diagrammatic perspective view of a door armrest of a vehicle with a seat control integrated into the armrest in accordance with the invention.

FIG. 8 is a diagrammatic perspective view of a door armrest 702 of a vehicle with a seat control integrated into the armrest in accordance with the invention. A touch sensor 108 with a graphic symbol of a vehicle seat is integrated in the armrest. The touch sensor 108 operates in the same manner as the touch sensors 108 of the above-described embodiments.

We claim:

1. In combination with a vehicle seat, a seat control unit comprising:
   a touch sensor including a touch-sensitive fabric;
   a support layer for said touch-sensitive fabric, said touch-sensitive fabric being attached to said support layer, said support layer being a vehicle interior component selected from the group consisting of a vehicle seat bottom, a center armrest, a door armrest, an interior door panel, a steering wheel, a dashboard, a center console, and a remote control unit;
   said touch-sensitive fabric defining a two-dimensional input region allowing a two-dimensional vector input as a function of a force exerted by a sliding motion on said touch-sensitive fabric;
   said touch sensor generating signals in response to the force exerted on said touch-sensitive fabric;
   a control circuit connected said touch sensor;
   said control circuit receiving the signals generated by said touch sensor and determining a position of the force exerted on said touch-sensitive fabric; and said control circuit generating control signals for controlling the vehicle seat in dependence on the position of the force exerted on said touch-sensitive fabric.

2. The seat control unit according to claim 1, wherein:
said touch sensor includes a cover layer; and
said touch-sensitive fabric is disposed between said support layer and said cover layer.

3. The seat control unit according to claim 1, wherein said control circuit is a programmable control circuit such that said control circuit and said touch sensor are usable for different vehicle seats having different adjustment functions.

4. The seat control unit according to claim 1, wherein said touch sensor has embossed graphic symbols indicating seat adjustment functions.

5. The seat control unit according to claim 1, wherein said touch sensor has embossed arrows indicating respective adjustment directions.

6. The seat control unit according to claim 1, wherein said touch sensor has an embossed diagrammatic representation of the vehicle seat.

7. The seat control unit according to claim 1, wherein:
said control circuit determines an amount of the force exerted on said touch-sensitive fabric; and
said control circuit generates control signals for controlling the vehicle seat in dependence on the position and the amount of the force exerted on said touch-sensitive fabric.

8. The seat control unit according to claim 7, wherein said control circuit is programmed such that the vehicle seat is adjusted with an increased speed if the amount of the force exerted on said touch-sensitive fabric is increased.

9. The seat control unit according to claim 1, wherein:
the vehicle seat has a seat bottom, a backrest and a headrest;
said touch sensor has a subregion assigned for adjusting a seat component selected from the group consisting of the seat bottom, the backrest and the headrest; and
said control circuit and said touch sensor are configured such that the seat component is adjusted by exerting a force in a sliding motion on said subregion of said touch sensor.

10. The seat control unit according to claim 9, wherein:
said control circuit determines a direction of the sliding motion across the subregion of the touch sensor; and
said control circuit generates control signals for controlling the seat component in dependence on the direction of the sliding motion across the subregion of the touch sensor.

11. The seat control unit according to claim 9, wherein:
said control circuit determines a speed of the sliding motion across the subregion of the touch sensor; and
said control circuit generates control signals for controlling the seat component in dependence on the speed of the sliding motion across the subregion of the touch sensor.

12. The seat control unit according to claim 9, wherein said control circuit and said touch sensor are configured such that said control circuit distinguishes between a force exerted by a sliding motion on said subregion of said touch sensor and a force exerted only in a given position of said subregion of said touch sensor.

13. A vehicle seat configuration comprising:
a vehicle seat having a seat bottom and a backrest;
a seat control unit operatively connected to said vehicle seat, said seat control unit including a touch sensor, a support layer and a control circuit;
said touch sensor including a touch-sensitive fabric;
said touch-sensitive fabric being attached to said support layer, said support layer being a vehicle interior component selected from the group consisting of said seat bottom, a center armrest, a door armrest, an interior door panel, a steering wheel, a dashboard, a center console, and a remote control unit;
said touch-sensitive fabric defining a two-dimensional input region allowing a two-dimensional vector input as a function of a force exerted by a sliding motion on said touch-sensitive fabric;
said touch sensor generating signals in response to the force exerted on said touch-sensitive fabric;
said control circuit being connected to said touch sensor and receiving the signals generated by said touch sensor, said control circuit determining a position of the force exerted on said touch-sensitive fabric; and
said control circuit generating control signals for controlling at least one of said seat bottom and said backrest in dependence on the position of the force exerted on said touch-sensitive fabric.

* * * * *